(No Model.) 2 Sheets—Sheet 2.
E. T. WHEET.
LEVER POWER ENGINE.
No. 378,155. Patented Feb. 21, 1888.
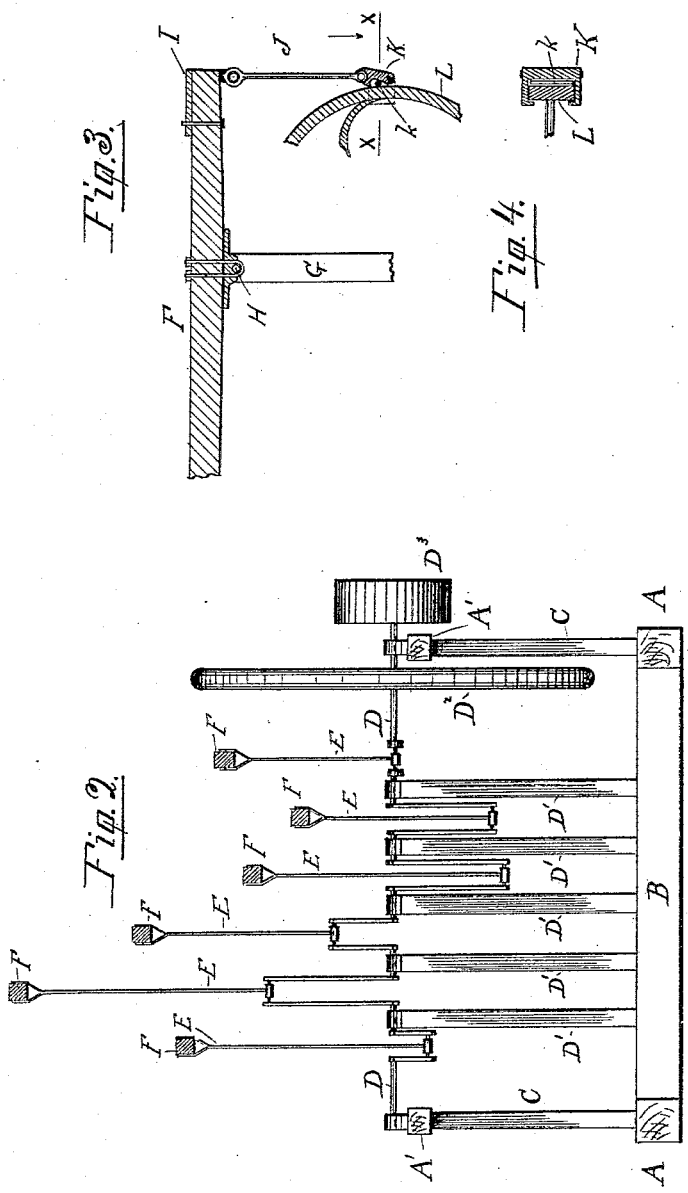

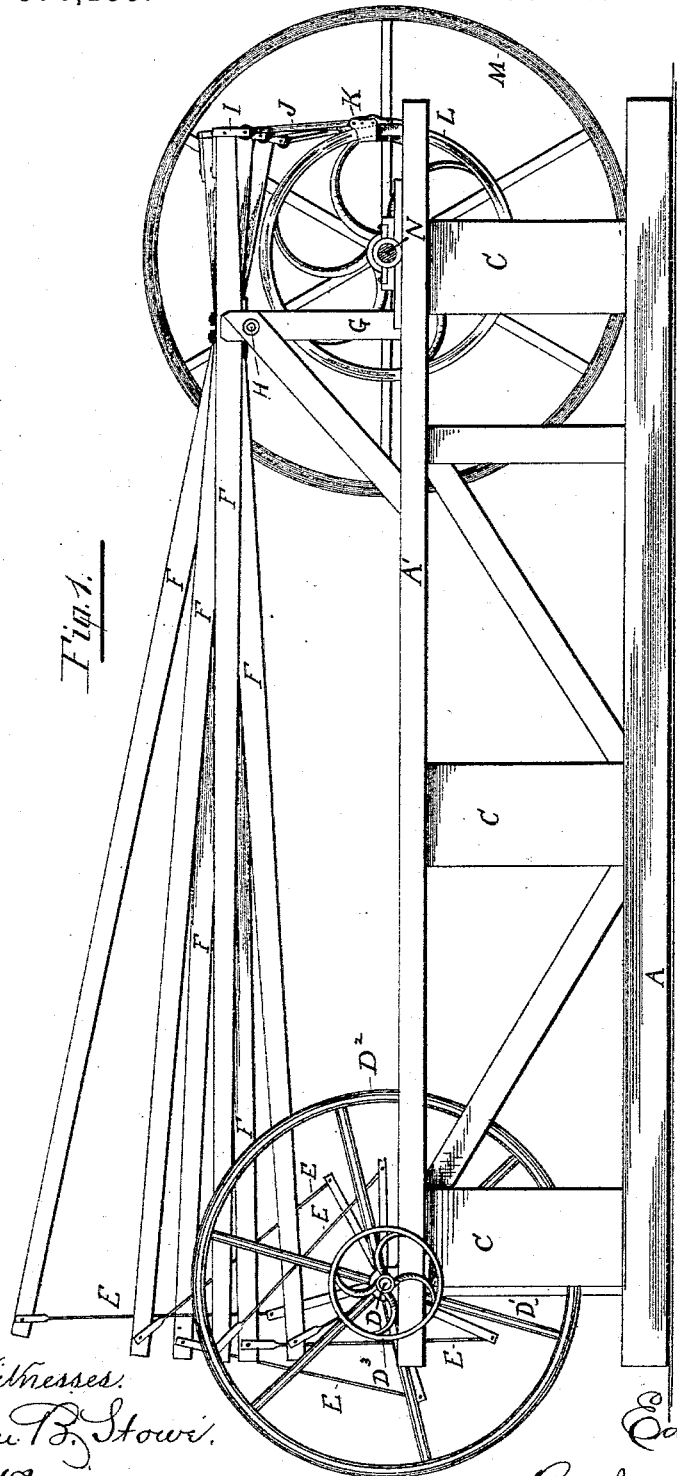

United States Patent Office.

EDWARD T. WHEET, OF OAKDALE, CALIFORNIA.

LEVER-POWER ENGINE.

SPECIFICATION forming part of Letters Patent No. 378,155, dated February 21, 1888.

Application filed October 12, 1887. Serial No. 252,181. (No model.)

*To all whom it may concern:*

Be it known that I, EDWARD T. WHEET, a citizen of the United States, residing at Oakdale, in the county of Stanislaus and State of California, have invented certain new and useful Improvements in Lever-Power Engines; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain improvements in apparatus which is designed to secure a greater degree of power by its use than if the prime motor itself were directly connected.

It consists of shafts provided with suitable pulleys and mounted upon a suitable frame, such shafts being driven by a series of levers, belts, &c., suitably connected to the motive power.

It also consists in certain details of construction, all of which will be more fully explained by reference to the accompanying drawings, in which—

Figure 1 is a side elevation. Fig. 2 is a rear end elevation. Fig. 3 is a section of a lever-clutch and wheel. Fig. 4 is a section of the clutch through line $x\ x$, Fig. 3.

A are the side sills of the frame of the machine. B are the end sills of the same.

A' are the top longitudinal beams.

C are standards, whose feet are attached to the sills A, and have the beams A' attached at their tops.

D is a crank-shaft, having several radial cranks of different lengths, and having its end bearings on beams A' and its center bearings on posts D', attached to the rear cross-sill, B.

D² is a crank balance-wheel on shaft D, and D³ is a pulley at its end, which may be connected by a belt with the motive power.

The radial cranks of the shaft D are provided each with an arm, E, connecting its crank with a lever, F, the series of which have their fulcra upon a cross-shaft, H, whose bearings are in vertical posts G, attached to beams A'. Clips I are attached to ends of the levers F, from which are suspended hangers or connecting-rods J, with grips K on their lower ends. Inside of each grip K, arranged in an inclined recess, is a small roller, $k$. The grips are loosely clipped upon the rims of a series of wheels, L, only one of which is shown, attached to a shaft, N, whose bearings are upon the beam A'.

M is a large driving-wheel upon the shaft N, from which a belt connects the machine and distributes the power where desired.

The levers F, acting alternately from the crank-shaft D, act in like manner upon the wheels L, the rollers $k$ of the grips K causing the grips to take hold on the faces of the wheels L as they ascend and as they descend, releasing their hold and permitting the grips to drop back into position for another hold upon the wheels.

The power applied, as above described, by the devices of my invention is greatly increased, either for running machinery at a relative rate of speed or in moving or raising great weights.

In the moving or raising of great weights the driving-wheel M may be a sprocket-wheel, connected by a chain belt with the matter to be moved, so as to prevent slipping of the belt, and the pulley D³ may be of like construction.

Having thus described my invention, what I claim is—

1. A frame comprising the longitudinal sills A, the longitudinal beams A', the cross-sills B, and posts C, in combination with the standards D', and connecting devices consisting of the shaft D with the radial cranks, the arms E, the levers F, the shaft D', having attached to it the crank-balance D², and the pulley D³, the shaft H, the posts G, the clips I, the hangers J, the shaft N, having the pulley M and the wheels L thereon, the grips K, with the rollers $k$, mounted in the lower ends of hangers J and adapted to bear on the faces of wheels L, substantially as set forth, combined substantially as de- In testimony whereof I affix my signature in presence of two witnesses.

EDWARD T. WHEET.

Witnesses:
ELIHU B. STOWE,
OSCAR B. HARVEY.